Sept. 7, 1926. 1,599,237
J. W. HUFFMAN
DEVICE FOR FORCING BEARINGS FROM VEHICLE HUBS
Filed April 6, 1925
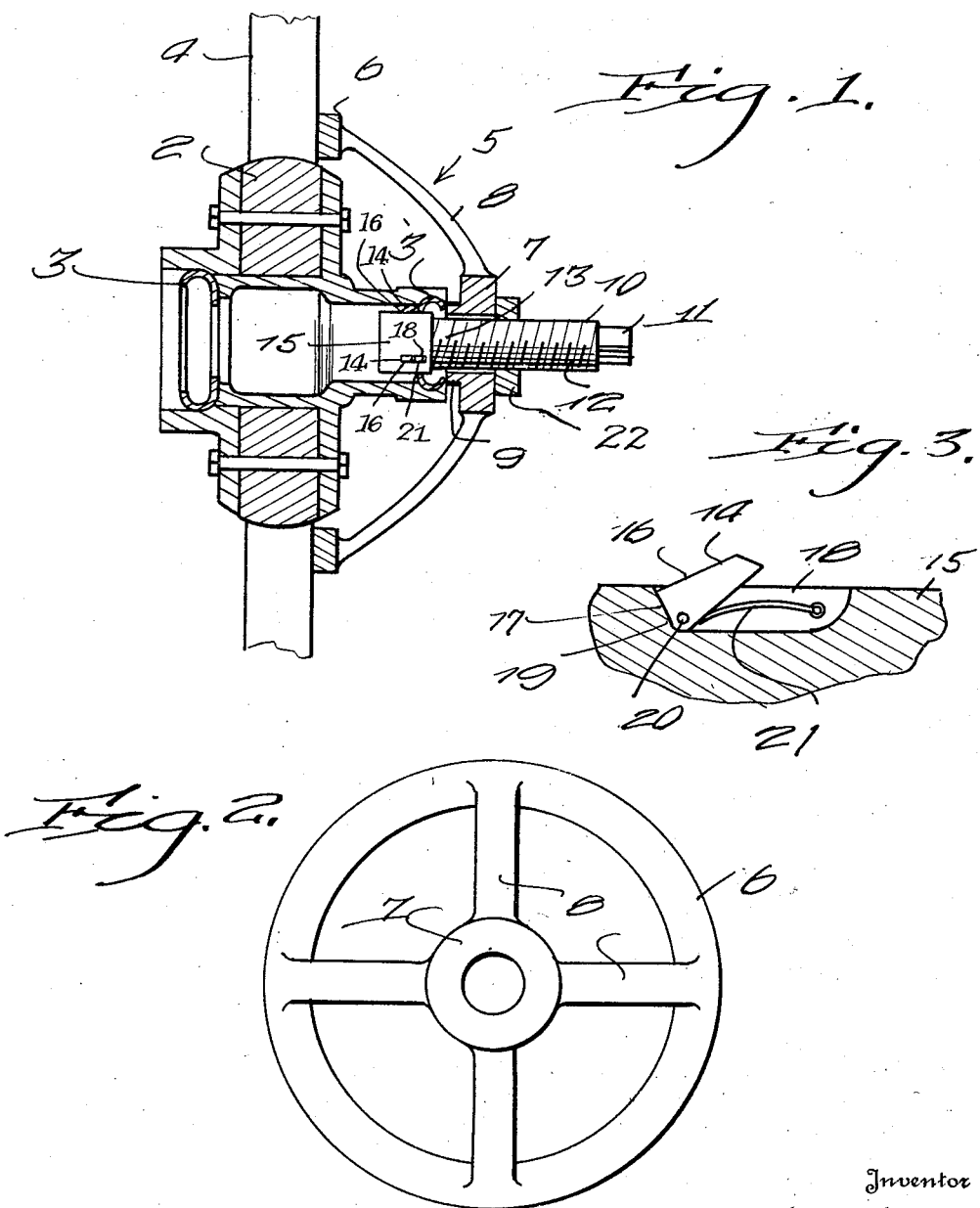
Inventor
John W. Huffman
By
Attorney Patented Sept. 7, 1926.

1,599,237

UNITED STATES PATENT OFFICE.

JOHN W. HUFFMAN, OF MARION, MICHIGAN.

DEVICE FOR FORCING BEARINGS FROM VEHICLE HUBS.

Application filed April 6, 1925. Serial No. 21,048.

This invention relates to forcing devices, and particularly to a device for forcing bearings from a vehicle hub.

An object of this invention is to provide a device by which the bearing may be taken from the hub of a Ford car or from other motor vehicle cars and to provide a device for generally forcing the bearings which is of simple construction, which may be quickly applied and which is efficient in operation, and which may be manufactured and sold at a cost which will compel its use.

With the foregoing and other objects in view, I have invented the device illustrated in the accompanying drawings, in which:

Figure 1 is a section through a hub provided with my improved attachment.

Figure 2 is a top plan view of my attachment, and Figure 3 is a detail sectional view illustrating the manner in which the pawls are connected to the head of the bolt member, Like reference characters indicate like parts throughout the several views and in the specification, in which 2 is a hub in which there is a bearing 3, usually of the roller bearing type, and radiating from the hub are the usual spokes 4, which are no part of my invention. My invention comprises a frame 5, consisting of an annular shoulder member 6 adapted to clear the hub 2 and to seat upon the spokes 4. Spaced apart and outward from the annulus 6, preferably, in the case of a Ford car, a distance of about 4 inches, is a second or smaller annulus 7 which is integrally joined with the annulus 6 by spokes 8, there being preferably four of the spokes 8. Extending inward from the annulus 7 is a smaller or guide annulus 9 which extends a distance preferably of three-fourths of an inch in this instance.

Slidable internal of the annulus 7 is a bolt member 10 which is provided with a head 11 adapted to be held by a wrench to prevent the turning of the member 10, the member 10 being threaded from its junction with the member 11 as at 12 substantially to a shoulder 13. Between the shoulder 13 and its adjacent end are a plurality of pawl-like members 14, there being in this instance preferably three of the members 14, equally divided around the periphery of the head 15; that is to say, spaced substantially 120 degrees apart. The members 14 are provided with inclined outer faces 16 and with shoulders 17 and are carried in channels 18, an end of the channel 18 being inclined as at 19 to cooperate with the shoulder 17 to form a rigid support in holding the pawl 14 in a predetermined outward position, the pawl 14 being pivoted upon a pin 20, and being adapted when in a closed position or when swung into the channel or slot 18 to be co-planar with or beneath the plane of the head and being yieldingly held outwardly by a spring 21. That is to say, that when the member 10 is inserted through the bearings 3 from the left, as shown in Figure 1, the inclined outer faces as the pawl members will contact the bearing and be forced inwardly so that the member 10 may be slid through the bearing and when the pawls have passed through the bearing, they will be thrown outwardly by the spring and serve as a shoulder to prevent their retraction through the bearing without pulling the bearing therewith.

In operation, therefore, all that is necessary is to push the device against the hub, whereupon the member 10 will slide through the bearing and automatically clamp the bearing on its opposite side, and by holding a wrench upon the nut portion 11 and by turning the nut 22 with a wrench or otherwise, a forced retraction is had of the member 10, drawing the bearing therewith, which, when it has been drawn a suitable distance, owing to the usual taper construction of the periphery of the bearing, will be released and may be easily drawn out by hand.

Claim:

A bearing forcing device comprising an annular member adapted to seat against the article carrying the bearing, a second and smaller annular member arranged in laterally spaced relation to the first and provided at its inner end with a reduced guide annulus, spokes connecting the members, a bolt member slidably mounted in the second member and guide annulus and provided with a head having channels extending londitudinally thereof, the inner end walls of the channels being inclined, pawls pivoted within the channels and provided with inclined shoulders, springs located within the channels to yieldingly hold the pawls in active position with their shoulders in contact with the inclined end walls of the channels, and a nut threaded on the bolt member and contacting with the second annular member.

In testimony whereof I affix my signature.

JOHN W. HUFFMAN.